United States Patent
Tanaka

[11] Patent Number: 5,276,576
[45] Date of Patent: Jan. 4, 1994

[54] METHOD AND DEVICE FOR OBTAINING DATA OF TAPE THINNESS AND/OR HUB RADIUS OF A TAPE REEL

[75] Inventor: Hideki Tanaka, Tokyo, Japan

[73] Assignee: Funai Electric Engineering Company Limited, Tokyo, Japan

[21] Appl. No.: 805,532

[22] Filed: Dec. 11, 1991

[30] Foreign Application Priority Data

May 7, 1991 [JP] Japan .................................. 3-131957
May 7, 1991 [JP] Japan .................................. 3-131958

[51] Int. Cl.$^5$ .............................................. G11B 15/18
[52] U.S. Cl. ...................................................... 360/137
[58] Field of Search ................. 360/137, 71, 72.1, 72.3, 360/74.1, 79.2, 74.5

[56] References Cited

U.S. PATENT DOCUMENTS

| | | | |
|---|---|---|---|
| 4,217,615 | 8/1980 | Suzuki | 360/137 |
| 4,352,472 | 10/1982 | Tyrsted | 242/186 |
| 4,644,436 | 2/1987 | Unno | 360/137 |
| 4,811,132 | 3/1989 | Hunter | 242/189 |

Primary Examiner—A. J. Heinz
Attorney, Agent, or Firm—Thomas R. Morrison

[57] ABSTRACT

A method and a device for obtaining a data of tape thinness, in which a calculation is carried out by using information of the changing pulse period based on rotational speed of a tape reel in a take-up side or a supply side, and the number of revolutions of the tape reel and tape velocity. The tape thinness d is obtained by a formula, $d = A \times v_0(T_T - T_{T0})/2\pi \times n_T$, in which, in case of the tape reel in the take-up side, the pulse period of the tape reel is represented as $T_T$, the initial pulse period of the tape reel is $T_{T0}$, the counted number of revolutions of the tape reel from initial setting time is $n_T$, tape velocity is $v_0$, and a pole number of the tape reel is A.

8 Claims, 1 Drawing Sheet

METHOD AND DEVICE FOR OBTAINING DATA OF TAPE THINNESS AND/OR HUB RADIUS OF A TAPE REEL

BACKGROUND OF THE INVENTION

The present invention relates to a method and a device for obtaining a data of tape thinness and/or hub radius of a tape reel. The obtained data is used for the purpose of calculation so as to obtain an amount of running time of a tape and residual playing or recording time of a tape such as a tape recorder, digital audio tape recorder and video tape recorder and the like.

In this kind of a device for detecting an amount of running time of a tape and an amount remaining on a tape and for the purpose of displaying elapsed time and residual time of a tape, it is conventionally known that a period of a pulse string (hereinafter referred to as reel pulse) obtained corresponding to the rotation of a tape reel in a take-up side or a supply side is measured, then the measured period is converted to a residual amount of tape by calculation (for example, refer to Japanese Laid-Open Patent Publication Nos. 58-19777, 57-143772, 63-214988, 63-214989 and 63-214990).

In a conventional calculating method, calculation is performed by substituting a constant value for the tape thinness or the hub radius without taken into consideration the tape thinness and the difference of the hub radius of a tape reel in a device. However, the value of tape thinness or hub radius is actually different from the other in response to the different kinds of tapes or manufacturing companies. Further, when a tape capable of long time recording is required in the future, it is necessary to make the hub radius smaller. In this case, erroneous data is output when tapes having different radius of hubs are used, thus an erroneous data of residual time of the tape is displayed. Further, a precise control of the tape velocity not for injuring the tape at the end part of the tape cannot be attained.

It is known that hardware is set to deal with the above problem corresponding to the difference of tape thinness. For example, in a digital audio tape recorder, there is provided a detecting sensor for detecting what kind of tape is used through a hole provided on a tape case. Based on the detected result, the value used for calculation is changed. Further, it is known that a changeover switch operated by a user corresponding to the kind of tapes is provided in a video tape recorder.

However, it may be difficult to correspond practically to many kinds of tapes having different thinness. Further, in the above video tape recorder providing the changeover switch, when the user sets the switch at the erroneous position, erroneous data is displayed.

OBJECTS AND SUMMARY OF THE INVENTION

An object of the present invention is to solve the above-mentioned problem. A further object of the present invention is to provide, a device in which the tape thinness can be calculated with the information of the changing pulse period obtained from the rotation of a tape reel in the take-up side or the supply side, the rotational speed of the tape reel in the take-up side or the supply side, and the tape velocity. The calculated tape thinness is accurate irrespective of the kinds of tapes.

In this calculation to obtain the tape thinness, when the tape thinness is d, the pulse period of the tape reel in the take-up side is $T_T$, the initial pulse period of the tape reel in the take-up side is $T_{T0}$, counted number of revolution of the tape reel in the take-up side from initial setting time $n_T$, tape velocity is $v_0$, pole number of the tape reel is A, the pulse period of the tape reel in the supply side is $T_S$, the initial pulse period of the tape reel in the supply side is $T_{S0}$, and the counted number of revolutions of the tape reel in the supply side from initial setting time is $n_S$, the following formulas can be achieved:

$$d = A \times V_0(T_T - T_{T0})/2\pi \times n_T, \text{ or}$$

$$d = A \times V_0(T_{S0} - T_S)/2\pi \times n_S$$

Then, the reel pulse calculation is performed by using the tape thinness d obtained from above formulas, so that the residual time of the tape can be displayed accurately. In conventional method, the reel pulse calculation is performed by substituting the constant value for the tape thinness in order to display the residual time of the tape. Accordingly, when tapes having a different thinness are used, an erroneous data of the residual time of the tape is displayed. In contrast, in the present invention, the tape thinness calculated by the above formulas is accurate so that the residual time of the tape can be displayed accurately. Further, the tape run is controlled adequately such as by slow down of tape velocity in the end part of the tape to protect the tape.

Further, in the conventional method, in the case of operating a hardware such as user changes a switch corresponding to the tape thinness, it becomes hard to correspond the operation to the tape thinness when a plurality of tapes having different thinness are used. In contrast, according to the present invention, the operation is carried out in correspondence with software so that such problem can be improved.

A further object of the present invention is to provide a device in which the hub radius can be calculated with a pulse period obtained from the rotation of tape reel in the take-up side or the supply side, the rotational speed of the tape reel in the take-up side or supply side, the tape velocity and tape thinness. The calculated hub radius is accurate irrespective of the kinds of tapes.

In the calculation to obtain the radius of a tape and a hub wound in the take-up side at the initial setting time, the value in the beginning of the tape is regarded as the hub radius. Meanwhile, in the calculation to obtain the radius of a tape and a hub wound in the supply side at the initial setting time, the value in the end of the tape is assumed to be the hub radius.

Then, the reel pulse calculation is performed with the hub radius obtained from the above formulas, so that the residual time of the tape can be displayed accurately. In the conventional method, the reel pulse calculation is performed by substituting a constant value for the hub radius in order to display the residual time of the tape. Accordingly, when tapes having different hub radius are used, an erroneous data of the residual time of the tape is displayed. In contrast, in the present invention, the hub radius calculated by the above formulas is accurate so that the residual time of the tape can be displayed accurately. Further, tape run is controlled adequately such as by slow down of the tape velocity in the end part of the tape to protect the tape.

DETAILED DESCRIPTION OF THE PREFERRED EMBODIMENT OF THE INVENTION

Now, an embodiment of method and device for obtaining a data of the tape thinness according to the present invention will be described in the following.

Figure 1:
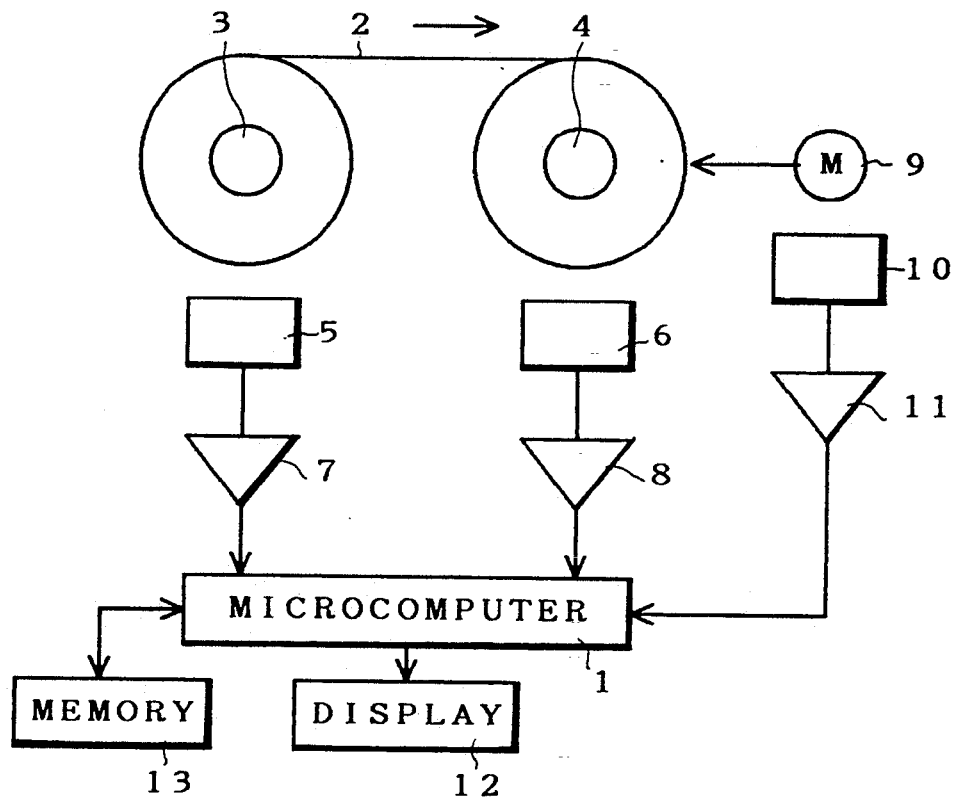
FIG. 1 is a block diagram showing a tape control device in accordance with one embodiment of the present invention.

FIG. 1 shows a structure of a tape recorder according to the present invention.

A microcomputer 1 receives information of the changing period of a pulse obtained from rotation of a tape reel (hereinafter referred to as reel pulse) and calculates the thinness of a tape with a calculation described later, thereby the reel pulse calculation is performed based on the tape thinness. The microcomputer 1 calculates the residual time of the tape and has a function to display thereof. In order to obtain a pulse corresponding to the rotation of a tape reel, there are provided a sensor 5 for detecting the rotation of a reel 3 in a supply side of a tape 2 and a sensor 6 for detecting the rotation of a reel 4 in a take-up side of the tape 2. Each pulse signal output from sensor 5 or 6 is performed waveform shaping through amplifier 7 or 8 respectively, then, fed to the microcomputer 1. The rotation of a motor 9 for driving reel 3 or 4 is detected by a FG (Frequency Generator) sensor 10. The detected signal is fed to the microcomputer 1 as tape velocity through an amplifier 11. A display 12 displays information such as the calculated residual time of the tape. A memory 13 stores a plurality kinds of data and the like. A servomechanism for driving tape reel is not shown in the drawing.

Data of the hub radius is stored in the memory 13 and given to the microcomputer 1. The microcomputer 1 stores the number of the reel pulse accumulatively so that the present position can be calculated based on the change of the accumulated number of pulse even when an operation of fast forward or rewind of the tape is performed.

Figure 2:
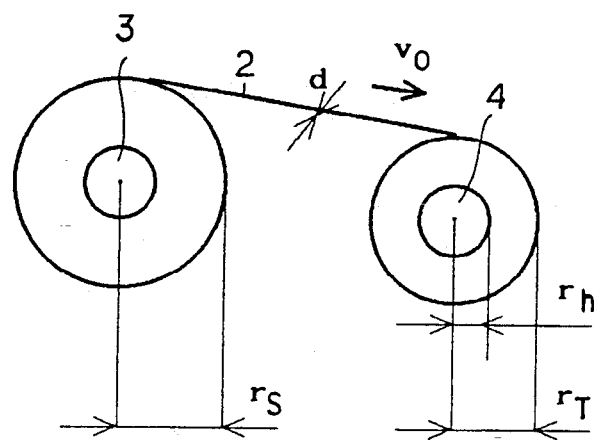
FIG. 2 is a schematic view showing a supply side and a take-up side in a tape to explain a calculation according to the present invention.

FIG. 2 shows a supply side and a take-up side in the tape reel. Formulas for detecting the tape thinness will be described below. In FIG. 2, the indications are as follows:

$v_0$: tape velocity
$d$: tape thinness
$r_h$: hub radius
$r_T$: radius of a tape and a hub wound in the take-up side
$r_S$: radius of a tape and a hub wound in the supply side
$r_{T0}$: $r_T$ at initial setting time
$r_{S0}$: $r_S$ at initial setting time
$T_T$: reel pulse period in the take-up side
$T_{T0}$: initial reel pulse period in the take-up side
$T_S$: reel pulse period in the supply side
$T_{S0}$: initial reel pulse period in the supply side
$A$: pole number of the tape reel
$n_T$: counted number of revolution of the tape reel in the take-up side from initial setting time (counted number of $T_T$ pulse for A times)
$n_S$: counted number of revolution of the tape reel in the supply side from initial setting time (counted number of $T_S$ pulse for A times)

First, in the case of the tape reel in the take-up side, the following formula is realized:

$$r_T = r_{T0} + d \times n_T \quad (1)$$

Further, $$2\pi r_T = A \times v_0 \times T_T$$

Therefore, $$r_T = \frac{A \times v_0}{2\pi} T_T \quad (2)$$

$$r_{T0} = \frac{A \times v_0}{2\pi} T_{T0} \quad (3)$$

From the above formulas (1), (2) and (3), the following formula is obtained:

$$\frac{A \times v_0}{2\pi} T_T = \frac{A \times v_0}{2\pi} T_{T0} + d \times n_T$$

Therefore, the tape thinness d is represented as follow:

$$d = \frac{A \times v_0}{2\pi \times n_T} (T_T - T_{T0}) \quad (4)$$

Similarly, in the case of the tape reel in the supply side, the following formula is realized:

$$r_S = r_{S0} - d \times n_S \quad (5)$$

Therefore, the tape thinness d is represented as follows:

$$d = \frac{A \times v_0}{2\pi \times n_S} (T_{S0} - T_S) \quad (6)$$

Now, a formula of reel calculation with use of the tape thinness d is described below. In the following formulas, $L_T$ indicates the length of the tape from the beginning, $t_T$ indicates elapsed time, and $S_T$ indicates an area of the tape wound in the take-up side.

$$S_T = \pi(r_T^2 - r_h^2)$$

$$L_T = \pi(r_T^2 - r_h^2)/d$$

Here, since $$t_T = L_T/v_0,$$

then, $$t_T = \pi(r_T^2 - r_h^2)/d \times v_0 \quad (7)$$

Elapsed time $t_T$ is represented by substituting the formula (7) for the formula (2).

$$t_T = \frac{\pi}{(d \times v_0)} \left( \frac{A^2 \times v_0^2}{4\pi^2} T_T^2 - r_h^2 \right) \quad (8)$$

Similarly, the residual time $t_S$ of the tape is represented as follows:

$$t_S = \frac{\pi}{d \times v_0} \left( \frac{A^2 \times v_0^2}{4\pi^2} T_S^2 - r_h^2 \right) \tag{9}$$

In the conventional method, elapsed time $t_T$ and the residual time $t_S$ of the tape are obtained by substituting the constant value for the tape thinness in the formulas (8) and (9), then displayed. Accordingly, when the tape thinness which is used is different from the substituted value, an erroneous data is displayed.

In contrast, in the embodiment according to the present invention, by substituting formulas (4) and (6) for formulas (8) and (9), elapsed time $t_T$ from the beginning of the tape is represented as follows:

$$t_T = \frac{2\pi^2 \times n_T}{A \times v_0^2(T_T - T_{T0})} \left( \frac{A^2 \times v_0^2}{4\pi^2} T_T^2 - r_h^2 \right) \tag{10}$$

Further, the residual time $t_S$ of the tape is represented as follows:

$$t_S = \frac{2\pi^2 \times n_S}{A \times v_0^2(T_{S0} - T_S)} \left( \frac{A^2 \times v_0^2}{4\pi^2} T_S^2 - r_h^2 \right) \tag{11}$$

Further, residual tape playing or recording time $t_{TAPE}$ is represented as follows:

$$t_{TAPE} = t_T + t_S \tag{12}$$

By obtaining the tape thinness d calculated by above formulas (4) and (6) and substituting the data thereof for formulas (8), (9) and (12), information such as elapsed time $t_T$ from the beginning of a tape, the residual time $t_S$ of the tape, the time capable of recording on the tape can be detected. Further, this information can be displayed on the display 12. The information is accurate even when the tape has whatever thinness.

Now, an embodiment of method and device for obtaining a data of a hub radius according to the present invention will be described as referred to FIGS. 1 and 2.

In this embodiment, a data of the tape thinness is stored in the memory 13. Formulas for detecting the hub radius will be described below.

In the case of the tape reel in the take-up side, the following formula is realized:

$$r_T = r_{T0} + d \times n_T \tag{13}$$

Further, $$2\pi r_T = A \times v_0 \times T_T$$

Therefore, $$r_T = \frac{A \times v_0}{2\pi} T_T \tag{14}$$

From the above formulas (13) and (14), the following formula is obtained:

$$r_{T0} = (A \times v_0/2\pi) T_T - d \times n_T \tag{15}$$

Here, when the tape is rewound to the beginning, and a plurality of parameters at the position are assumed to be an initial value, $r_{T0}$ is equal to the hub radius $r_h$. Accordingly, the hub radius can be obtained from the above formula (15). That is, the hub radius can be obtained by substituting the period of the reel pulse and the like which is obtained when the reel is rotated for a few rounds after running the tape from the beginning for the above formula (15).

Similarly, the hub radius of the tape reel in the supply side is represented as follows:

$$r_S = r_{S0} - d \times n_S \tag{16}$$

$$r_{S0} = \frac{A \times v_0}{2\pi} T_{S0} \tag{17}$$

From the above formulas (16) and (17), the following formula is realized:

$$r_S = \frac{A \times v_0}{2\pi} T_{S0} - d \times n_S \tag{18}$$

Here, when the tape runs with constant velocity at the speed of $v_0$ in the end part of the tape, the value of $r_S$ at the moment the winding of the tape to the position of the end part of the tape becomes equal to the hub radius $r_h$. Accordingly, the hub radius is obtained from the formula (18). By storing the data obtained from the formulas (15) and (18) in the memory 13, the reel calculation can be executed with the stored data even when the tape begins to run from the middle, thereby the residual time of the tape can be obtained accurately.

A formula of reel calculation for obtaining residual time of tape with use of the tape thinness is described below. In the following formulas, $L_T$ indicates the length of the tape from the beginning, $t_T$ indicates elapsed time, and $S_T$ indicates an area of the tape wound in the take-up side.

$$S_T = \pi(r_T^2 - r_h^2)$$

$$L_T = \pi(r_T^2 - r_h^2)/d$$

Here, since $$t_T = L_T/v_0,$$

then, $$t_T = \pi(r_T^2 - r_h^2)/d \times v_0 \tag{19}$$

Elapsed time $t_T$ is represented by substituting the formula (19) for the formula (14).

$$t_T = \frac{\pi}{(d \times v_0)} \left( \frac{A^2 \times v_0^2}{4\pi^2} T_T^2 - r_h^2 \right) \tag{20}$$

Similarly, the residual time $t_S$ of the tape is represented as follows:

$$t_S = \frac{\pi}{d \times v_0} \left( \frac{A^2 \times v_0^2}{4\pi^2} T_S^2 - r_h^2 \right) \tag{21}$$

The elapsed time $t_T$, the residual time $t_S$ of the tape can be obtained by substituting the hub radius $r_h$ in the formulas (20) and (21) for the value obtained from described above and displayed.

In conventional method, erroneous data is output since a constant value is substituted in the hub radius when tapes having different hub radius are used. However, according to the present invention, accurate data can be output. That is, data such as elapsed time $t_T$, the residual time $t_S$ of the tape, and the length of time capable of recording can be displayed on the display 12. The data is accurate even when tapes having whatever hub radius are used.

In the present invention, a constant value is substituted in tape thinness d, meanwhile, tape thinness d can be obtained from the following formulas:

In case of the tape reel of the take-up side, $$d = \frac{A \times v_0}{2\pi \times n_T} (T_T - T_{T0})$$

In case of the tape reel of the supply side, $$d = \frac{A \times v_0}{2\pi \times n_S} (T_{S0} - T_S)$$

An explanation for calculating tape thinness d is omitted here.

Elapsed time $t_T$ from the beginning of the tape is represented as follows by substituting above formulas for formulas (20) and (21)

$$t_T = \frac{2\pi^2 \times n_T}{A \times v_0^2(T_T - T_{T0})} \left( \frac{A^2 \times v_0^2}{4\pi^2} T_T^2 - r_h^2 \right) \quad (22)$$

Further, the residual time $t_S$ of the tape is represented as follows:

$$t_S = \frac{2\pi^2 \times n_S}{A \times v_0^2(T_{S0} - T_S)} \left( \frac{A^2 \times v_0^2}{4\pi^2} T_S^2 - r_h^2 \right) \quad (23)$$

Further, residual tape playing or recording time $t_{TAPE}$ is represented as follow:

$$t_{TAPE} = t_T + t_S \quad (24)$$

By substituting the hub radius $r_h$ for the above formulas, more accurate information such as the residual time of the tape and the like can be obtained and displayed because both the tape thinness d and the hub radius $r_h$ are accurate value.

What is claimed is:

1. A method for obtaining data of a tape thinness comprising:
   detecting a first pulse period of a take-up reel at a first rotation time;
   detecting a second pulse period of said take-up reel at a second rotation time;
   counting a number of revolutions of said take-up reel; and
   calculating said tape thinness (d) based on a pole number (A) of said take-up reel, a predetermined tape velocity ($v_0$), said first pulse period ($T_{T0}$), said second pulse period ($T_T$), and said number of revolutions ($n_T$), in accordance with a formula, $d = A \times v_0 (T_T - T_{T0})/(2\pi \times n_T)$.

2. A method for obtaining data of a tape thinness comprising:
   detecting a first pulse period of a supply reel at a first rotation time;
   detecting a second pulse period of said supply reel at a second rotation time;
   counting a number of revolutions of said supply reel; and
   calculating said tape thinness (d) based on a pole number (A) of said supply reel, a predetermined tape velocity ($v_0$), said first pulse period ($T_{S0}$), said second pulse period ($T_S$), and said number of revolutions ($n_S$), in accordance with a formula, $d = A \times v_0(T_{S0} - T_S)/(2\pi \times n_S)$.

3. A device for obtaining data of a tape thinness comprising:
   means for detecting a first pulse period and a second pulse period wherein said pulse periods correspond to rotations of a take-up reel;
   means for counting a number of revolutions of said take-up reel based on said rotations; and
   means for calculating said tape thinness (d) based on a pole number (A) of said take-up reel, a predetermined tape velocity ($V_0$), said first pulse period ($T_{T0}$), said second pulse period ($T_T$), and said number of revolutions, in accordance with a formula, $d = A \times v_0(T_T - T_{T0})/(2\pi \times n_T)$.

4. A device for obtaining data of a tape thinness comprising:
   means for detecting a first pulse period and a second pulse period wherein said pulse periods correspond to rotations of a supply reel;
   means for counting a number of revolutions of said supply reel based on said rotations; and
   means for calculating said tape thinness (d) based on a pole number (A) of said supply reel, a predetermined tape velocity ($v_0$), said first pulse period ($T_{S0}$), said second pulse period ($T_S$), and said number of revolutions ($n_S$), in accordance with a formula, $d = A \times v_0(T_{S0} - T_S)/(2\pi \times n_S)$.

5. A method for obtaining data of a hub radius comprising:
   rewinding to a beginning of a take-up reel;
   detecting a pulse period of said take-up reel at a single rotation time in play mode; and
   calculating a hub radius ($r_h$) based on a pole number (A) of said take-up reel, a predetermined tape velocity ($v_0$), and said pulse period ($T_T$), in accordance with a formula, $r_h = (A \times v_0/2\pi)T_T$.

6. A method for obtaining data of a hub radius comprising:
   winding to an end of a supply reel;
   detecting a pulse period of said supply reel at a single rotation time in reverse play mode; and
   calculating a hub radius ($r_h$) based on a pole number (A) of said supply reel, a predetermined tape velocity ($v_0$), and said pulse period ($T_S$), in accordance with a formula, $r_h = (A \times v_0/2\pi)T_S$.

7. A device for obtaining data of a hub radius comprising:
   means for rewinding a take-up reel to a beginning;

means for detecting a pulse period of said take-up reel at a single rotation time in play mode; and means for calculating a hub radius ($r_h$) based on a pole number (A) of said take-up reel, a predetermined tape velocity ($v_0$), said pulse period ($T_T$), and said number of revolutions ($n_T$), in accordance with a formula, $$r_h = (A \times v_0/2\pi) T_T.$$

8. A device for obtaining data of a hub radius comprising:

means for winding a supply reel to an end;

means for detecting a pulse period of said supply reel at a single rotational time in reverse play mode; and means for calculating a hub radius ($r_h$) based on a pole number (A) of said supply reel, a predetermined tape velocity ($v_0$), said pulse period ($T_S$), and said number of revolutions ($n_T$), in accordance with a formula, $$r_h = (A \times v_0/2\pi) T_S.$$

* * * * *